United States Patent

Aoshima et al.

[11] Patent Number: 5,213,723
[45] Date of Patent: May 25, 1993

[54] PROCESS FOR PRODUCING RUBBER PRODUCTS

[75] Inventors: Masashi Aoshima; Tadashi Jinno, both of Osaka, Japan

[73] Assignee: Sumitomo Chemical Co., Ltd., Osaka, Japan

[21] Appl. No.: 732,955

[22] Filed: Jul. 19, 1991

Related U.S. Application Data

[63] Continuation of Ser. No. 333,734, Apr. 3, 1989, abandoned, which is a continuation of Ser. No. 870,046, May 3, 1986, abandoned.

[30] Foreign Application Priority Data

Jun. 3, 1985 [JP] Japan .................. 60-120828

[51] Int. Cl.$^5$ .................. B29C 35/06; B29C 35/10; B29C 35/14; C08L 9/00
[52] U.S. Cl. .................. 264/26; 264/22; 264/25; 264/236; 522/158; 522/159; 522/60; 522/121
[58] Field of Search .......... 264/26, 22, 25; 522/60, 522/61, 158, 159, 120, 121

[56] References Cited

U.S. PATENT DOCUMENTS

| | | | |
|---|---|---|---|
| 3,293,108 | 12/1966 | Nairn et al. | 521/97 |
| 3,717,559 | 2/1973 | Oyama et al. | 521/80 |
| 4,032,606 | 6/1977 | Solomatin et al. | 522/99 |
| 4,049,757 | 9/1977 | Kammel et al. | 522/60 |
| 4,062,998 | 12/1977 | Hagiwara et al. | 428/380 |
| 4,124,344 | 11/1978 | Kiyono | 264/25 |
| 4,203,815 | 5/1980 | Noda | 264/25 |
| 4,221,253 | 9/1980 | Seiberling | 522/3 |
| 4,447,488 | 5/1984 | Simm et al. | 428/492 |
| 4,491,616 | 1/1985 | Schmidle et al. | 428/913 |
| 4,510,303 | 4/1985 | Oda | 526/169.2 |

FOREIGN PATENT DOCUMENTS 3013723 10/1981 Fed. Rep. of Germany .
1291135 3/1962 France .
 922531 4/1963 United Kingdom .

OTHER PUBLICATIONS

Patent Abstracts of Japan, vol. 5, No. 188, Nov. 27, 1981, p. 127 C 81 Resp. JP-A-56-112940 (Yamaguchi).
Pat. Abs. Japan, vol. 5, No. 188, Nov. 27, 1981, p. 127 C 81, JP-A-56-112941 (Yamaguchi).
Derwent Abs. 81-76822 D/42, Oct. 1981 (Yamaguchi).
Pat. Abs. Japan, vol. 7, No. 122 May 1983, p. 122 C 168 (JP-A-58-42630 Nitto).
Derwent Abst. 83-38135k/16, Apr. 1983 (Nitto).
Kautschuk & Gummi Kunststoffe, vol. 37, No. 10, Oct. 1984, pp. 864-868, Heidelberg, DE; A. M. Sonnenberg: "Electron beam vulcanization of elastomers".

*Primary Examiner*—Marion E. McCamish
*Assistant Examiner*—Arthur H. Koeckert
*Attorney, Agent, or Firm*—Sughrue, Mion, Zinn, Macpeak & Seas

[57] ABSTRACT

A process for producing a rubber product by vulcanizing a molded article composed of a rubber composition containing a peroxide as a crosslinking agent in the presence of oxygen, wherein said molded article is irradiated with electron beams, is disclosed. The rubber article produced by the invention is not sticky on the surface and exhibits excellent tensile properties.

8 Claims, No Drawings

PROCESS FOR PRODUCING RUBBER PRODUCTS

This is a continuation of application Ser. No. 07/333,734 filed Apr. 3, 1989, and which is a continuation of application Ser. No. 06/870,046 filed Jun. 3, 1986, now abandoned.

FIELD OF THE INVENTION

The present invention relates to a process for producing rubber products by vulcanizing a molded article composed of a rubber composition containing a peroxide as a crosslinking agent in the presence of oxygen, wherein the molded article is irradiated with electron beams.

BACKGROUND OF THE INVENTION

Compared with vulcanization of rubbers with sulfur, the technique of vulcanization with peroxides used as crosslinking agents offers superior heat resistance, compression set, and electrical insulation for molded articles and superior properties in compounding with colored substances, e.g., coloration and stability of color. Vulcanization with peroxides has therefore enjoyed extensive commercial use in applications where the aforementioned properties are particularly important.

However, as is well known, vulcanization with peroxides is hindered by oxygen and, if the vulcanization is carried out in the presence of air, crosslinking reaction does not proceed to an adequate extent on the surface of the resulting molded article which is in contact with air, leading to various problems such as causing extreme tackiness, reduction in strength, and insufficient hardness. These problems cause defects that the surface of the molded article is readily scratched and is poor in wear resistance and slipperiness.

Accordingly, vulcanization with peroxides is generally applied to the production of rubber products using a vulcanization step shielded from air, such as press molding, injection molding, or transfer molding. In the case of autoclave cure which is a commercialized technique for fabricating hoses and electric wires, products satisfying practical requirements can be obtained by replacing air (oxygen) with steam. However, in order to yield products of consistent quality, utmost care must be exercized in process control.

Continuous vulcanization of rubbers has recently gained commercial acceptance, and industrially important rubber products such as hoses, weather strips, and roofing sheets are currently produced by the continuous vulcanization method. While continuous vulcanization can be performed by various methods, the most commonly employed techniques are hot-air vulcanization (HAV), ultra-high frequency vulcanization (UHF), and fluid bed vulcanization (FBV) process. However, any of these methods perform vulcanization in the presence of air and, hence, are not suitable for vulcanization with peroxides.

The present inventors therefore made extensive investigations to develop a continuous method of vulcanization with peroxides which is capable of providing rubber products with excellent heat resistance and compression set.

SUMMARY OF THE INVENTION

The present invention provides a process for producing a rubber product by continuously vulcanizing a molded article composed of a rubber composition containing a peroxide as a crosslinking agent in the presence of oxygen, wherein the molded article is irradiated with electron beams. The irradiation with electron beams is typically carried out in a step which is preliminary to the vulcanization with a peroxide but, if desired, the molded article may be irradiated with electron beams after the vulcanization with a peroxide.

DETAILED DESCRIPTION OF THE INVENTION

In accordance with the process of the present invention, a molded rubber article is subjected, either before or after vulcanization with a peroxide, to irradiation with electron beams to an appropriate degree so as to vulcanize a surface layer of the molded rubber.

The term "vulcanization" as used herein means vulcanization which is performed in the presence of air (or oxygen) and may include techniques of vulcanization with heating media such as steam or heated nitrogen gas if a significant amount of air (or oxygen) cannot be eliminated. Vulcanization may be carried out in the present invention by employing the aforementioned HAV, UHF or FBV process. Vulcanization may also be performed in a batch system by, for example, autoclave cure of oven cure.

The method and conditions of irradiation with electron beams are not critical, and appropriate acceleration voltages, irradiation doses, and irradiation equipments may be selected depending on specific use of the final product. The acceleration voltage typically ranges from 100 to 500 kV and more suitably from 150 to 400 kV, and the irradiation dose from 1 to 40 Mrad and more suitably from 2 to 30 Mrad. Needless to say, these ranges may be suitably adjusted depending on the need.

The rubber composition referred to in the present invention is characterized by using a peroxide as a crosslinking agent. While the peroxide usable as a crosslinking agent is not limited to any particular compounds, illustrative examples include dicumyl peroxide, 1,3-bis(t-butylperoxyisopropyl)benzene, 2,5-dimethyl-2,5-di(t-butylperoxy)hexane, 1,1-di-t-butylperoxy-3,3,5-trimethylcyclohexane, cumene hydroperoxide, di-t-butyl peroxide, t-butylcumyl peroxide, p-chlorobenzoyl peroxide, t-butyl peroxybenzoate, and t-butylperoxyisopropyl carbonate.

The rubber composition as used in the present invention contains, in addition to the peroxide as a crosslinking agent, a variety of ingredients such as rubber bases, resins, carbon black, talc, clay, calcium carbonate, silica, process oils, processing aids, activators, crosslinking aids, antioxidants, pigments, foaming agents, foaming aids, and any other necessary components. If desired, a variety of short fibers may be incorporated in the rubber composition.

Illustrative rubber bases include styrenebutadiene rubber, ethylene-propylene rubber, acrylonitrile-butadiene rubber, chlorinated ethylene-propylene rubber, chlorinated polyethylene, chlorosulfonated polyethylene, silicone rubber, and fluorinated rubber. Natural rubber and chloroprene rubber may be used as required. Illustrative resins include polyethylene, polypropylene, an ethylene-vinyl acetate copolymer, and polyvinyl chloride.

Illustrative processing aids include agents that serve to improve the dispersibility of fillers during mastication, tackifiers, and extrusion aids. Illustrative activators include a variety of metal oxides such as zinc white and zinc stearate, glycols, and amines.

Illustrative crosslinking aids that assist the vulcanization with peroxides include a variety of sulfur compounds, oximes, maleimides, and methacrylic acid esters.

The types and amounts of these ingredients and the peroxide used as a crosslinking agent are properly selected and determined in accordance with the specific properties required for the final rubber product.

The rubber composition in accordance with the present invention may be prepared by blending appropriate ingredients with rubber by means of a suitable machine such as a Banbury mixer, a kneader, or a roll, and is subsequently molded by means of a calendar roll or an extruder.

By employing the process of the present invention, rubber products such as hoses, rubber sheets, roofing sheets, canvas sheets, weather strips, sealing sponge, protector tubes, and protector sponge having excellent heat resistance, compression set, and electrical insulation can be obtained. In addition, the rubber products obtained are not sticky on the surface and exhibit excellent tensile properties.

The following examples are provided for the purpose of further illustrating the present invention and are by no means intended to limit the invention.

EXAMPLE 1

A peroxide-loaded rubber composition having the recipe indicated below was masticated on rolls (10 in $\phi$), and the admixture was fed into an appropriate extruder for rubber (ID: 45 mm$\phi$) from which a sheet having a thickness of 3 mm and a width of 40 mm was extrusion molded.

| Rubber recipe | |
| --- | --- |
| | Parts by Weight |
| Esprene ® 501A*1 | 100 |
| Zinc white | 5 |
| Stearic acid | 1 |
| FEF carbon black | 90 |
| Paraffinic process oil | 30 |
| Perhexa ® 3M*2 | 3 |
| Ethylene glycol dimethylacrylate | 1 |

*1Esprene ® 501A. EPDM (ethylene-propylene-diene terpolymer) of Sumitomo Chemical Co., Ltd.
*2Perhexa ® 3M. 1,1-di-t-butylperoxy-3,3,5-trimethyl cyclohexane (peroxide) of Nippon Oils & Fats Co., Ltd.

Both sides of the sheet were irradiated with electron beams at an acceleration voltage of 150 kV to give a total dose of 20 Mrad. The irradiated sheet was then vulcanized in a gear oven (in air) at 150° C. for 15 minutes. Data on the surface stickness, tensile strength, and elongation of the vulcanized rubber sheet are given in Table 1, which clearly demonstrates the improvement attained by irradiation with electron beams.

EXAMPLE 2

A sample of an unvulcanized (green) rubber sheet which was of the same type as that extrusion molded in Example 1 was vulcanized in a gear oven (in air) at 150° C. for 15 minutes. Thereafter, both sides of the sticky vulcanized sheet were irradiated with electron beams at an acceleration voltage of 150 kV to give a total doese of 20 Mrad. The results are shown in Table 1.

The surfaces of the oven-vulcanized sheet ceased to be sticky after irradiation with electron beams. A measurable increase in the tensile strength of the sheet also occurred as a result of irradiation with electron beams.

EXAMPLE 3

A sample of an irradiated rubber sheet which was of the same type as obtained in Example 1 was vulcanized by autoclave cure at 150° C. for 15 minutes. The results are shown in Table 1.

COMPARATIVE EXAMPLE 1

A sample of a green rubber sheet which was of the same type as that extrusion molded in Example 1 was vulcanized in a gear oven (in air) at 150° C. for 15 minutes. The vulcanized rubber sheet was very sticky and had reduced tensile properties, as is evident from Table 1.

COMPARATIVE EXAMPLE 2

A sample of a green rubber sheet which was of the same type as that extrusion molded in Example 1 was subjected to autoclave cure at 150° C. for 15 minutes. The results were unsatisfactory as shown in Table 1.

COMPARATIVE EXAMPLE 3

A rubber composition having the recipe shown in Example 1 was vulcanized on a heat press at 150° C. for 10 minutes. Data on the surface stickiness and tensile properties of the vulcanized rubber are shown in Table 1. The vulcanization system employed in this comparative example permitted no contact with oxygen and, hence, produced satisfactory results.

TABLE 1

| Run No. | Example 1 | Example 2 | Example 3 | Comparative Example 1 | Comparative Example 2 | Comparative Example 3 |
| --- | --- | --- | --- | --- | --- | --- |
| Vulcanization method | Gear-oven vulcanization after irradiation with electron beams | Irradiation with electron beams after gear oven vulcanization | Autoclave cure after irradiation with electron beams | Mere vulcanization in gear oven | Mere autoclave cure | Press vulcanization |
| Tensile strength*3 | 109 | 108 | 107 | 80 | 85 | 112 |
| Tensile elongation (%) | 260 | 260 | 270 | 280 | 270 | 280 |
| Surface stickiness of vulcanized rubber | None | Substantially absent | None | Very sticky | Sticky | None |

*3Tensile test was conducted in accordance with JIS K6301.

While the invention has been described in detail and with reference to specific embodiments thereof, it will be apparent to one skilled in the art that various changes and modifications can be made therein without departing from the spirit and scope thereof.

What is claimed is:

1. A process for producing a rubber product from a rubber composition containing a peroxide as a cross-linking agent, said rubber composition characterized by remaining tacky at the surface if cross-linked only by thermal vulcanization in the presence of oxygen because of vulcanization hindrance by oxygen at the surface thereof, comprising, in order, forming a molded article from said rubber composition, cross-linking the molded article only at a surface layer by irradiation with electron beams following which the core of said molded article is essentially uncross-linked, and subjecting said molded article to continuous thermal vulcanization selected from hot air vulcanization, ultra-high frequency vulcanization and fluid bed vulcanization, said vulcanization being carried out in the presence of oxygen, and said rubber being selected from the group consisting of styrene-butadiene rubber, ethylene-propylene rubber, ethylene-propylene-diene terpolymer rubber, acrylonitrile-butadiene rubber, chlorinated ethylene-propylene rubber, chlorinated polyethylene, chlorosulfonated polyethylene, silicone rubber, fluorinated rubber, natural rubber, and chloroprene rubber.

2. A process as in claim 1, wherein said peroxide is selected from dicumyl peroxide, 1,3-bis(t-butylperoxyisopropyl)benzene, 2,5-dimethyl-2,5-di(t-butylperoxy)hexane, 1,1-di-t-butylperoxy-3,3,5-trimethylcyclohexane, cumene hydroperoxide, di-t-butyl peroxide, t-butylcumyl peroxide, p-chlorobenzoyl peroxide, t-butyl peroxybenzoate, or t-butylperoxyisopropyl carbonate.

3. A process as in claim 1, wherein the acceleration voltage for said electron beams is from 100 to 500 kV.

4. A process as in claim 3, wherein the irradiation dosage is from 1 to 40 Mrad.

5. A process as in claim 3, wherein the irradiation dosage is from 2 to 30 Mrad.

6. A process as in claim 1, wherein the acceleration voltage for the electron beams is from 150 to 400 kV.

7. A process as in claim 1, wherein said vulcanizing is hot-air vulcanization, ultra-high frequency vulcanization, or fluid bed vulcanization, and wherein said surface crosslinking is effected with electron beams having an acceleration voltage within the range of from 100 to 500 kV and the irradiation dosage is from 1 to 40 Mrad.

8. A process as in claim 7, wherein the acceleration voltage for the electron beams ranges from 150 to 400 kV and the irradiation dosage ranges from 2 to 30 Mrad.

* * * * *